United States Patent [19]

Ulug

[11] Patent Number: 4,534,061
[45] Date of Patent: Aug. 6, 1985

[54] DETERMINISTIC MULTI-ACCESS METHOD FOR A DECENTRALIZED MOBILE RADIO SYSTEM

[75] Inventor: Mehmet E. Ulug, Schenectady, N.Y.

[73] Assignee: General Electric Company, Schenectady, N.Y.

[21] Appl. No.: 529,197

[22] Filed: Sep. 6, 1983

[51] Int. Cl.³ .......................... H04B 7/14; H04B 7/00
[52] U.S. Cl. ........................................ 455/17; 455/32; 455/34; 455/54
[58] Field of Search .................................... 455/32–34, 455/54, 56, 7, 17; 179/2 EB; 340/825.5; 370/93–95

[56] References Cited

U.S. PATENT DOCUMENTS

| | | | |
|---|---|---|---|
| 3,634,627 | 1/1972 | Velentini | 455/34 |
| 4,281,413 | 7/1981 | Forrest | 455/54 |
| 4,360,927 | 11/1982 | Bowen et al. | 455/32 |
| 4,400,585 | 8/1983 | Kaman et al. | 455/34 |
| 4,409,687 | 10/1983 | Berti et al. | 455/32 |

Primary Examiner—Jin F. Ng
Attorney, Agent, or Firm—George B. Fox; James C. Davis, Jr.; Bernard J. Lacomis

[57] ABSTRACT

A mobile radio system uses a predetermined number of control channels over which a hand-shake routine is performed to determine called station availability, before one of a limited number of talk channels (local and repeater) is assigned for communication between a calling and the called station. After locating an idle talk channel (local channels are searched first), the control channel to which the called station is predeterminedly assigned is attempted to be accessed. Transmission times on the control channel are a function of the called station's identification code, thus creating a logical ring. Provision is made for message based priorities, emergency numbers and high priority for stations having experienced a previous unsuccessful attempt to access a control channel.

12 Claims, 9 Drawing Figures

FIG. 1

FIG. 9 — ROUTINE FOR EMERGENCY NUMBERS

DETERMINISTIC MULTI-ACCESS METHOD FOR A DECENTRALIZED MOBILE RADIO SYSTEM

BACKGROUND OF THE INVENTION

This invention relates to data transmission systems and more particularly to a deterministic (i.e. delays to access a channel are limited or bounded) multiaccess method for accessing a control channel of a decentralized mobile radio system before a voice channel is permitted to be accessed, wherein the system includes a base radio station, a repeater station and one or more mobile or portable radios among which data may be transferred. Each base station, repeater station and radio comprises a transmitter and a receiver or a transceiver. Several known multi-access methods are described in "Multiaccess Protocols in Packet Communication Systems" - F. A. Tobagi, IEEE Transactions on Communications, Vol. COM-28, No. 4, p. 468 (1980) [hereinafter Tobagi].

In some commmunication systems, such as TE-LENET network of Telenet Corporation and others using the X.25 protocol of International Consultative Committee for Telegraphy and Telephony (CCITT), a calling station and a called station perform a handshake routine (i.e. transmission of a call request and a call accept packet, respectively) to determine if the called station is free to accept an incoming call before a virtual circuit can be set up for data transmission between the calling and called station. It is to be understood that the terms data channel, talk channel, and voice channel as used herein are interchangeable and indicate that either voice (encoded voice) and/or data may be transmitted over the channel.

In mobile radio systems random multi-access protocols, such as ALOHA (see Tobagi, supra, p. 471), have been used. However, only about 18 percent of maximum channel utilization is possible for pure ALOHA. Slotted ALOHA (see Tobagi, supra, p. 471) allows only about 36 percent of maximum channel utilization and requires synchronization of all transmitters. If the load, i.e. number of stations attempting to access a control channel, exceeds the allowable utilization, the control channel throughput decreases and may drop to zero, even if a voice channel is idle.

Another possible protocol is a token passing scheme (for one type see Tobagi, supra, p. 483), i.e. permitting a station to transmit only during the interval it controls the token. However, a token passing scheme is very difficult to implement for a decentralized system. Among the problems of using a token passing scheme in a mobile radio environment are the following: (1) Only a portion of all stations, i.e. mobile and base, assigned to a logical ring may be active (i.e., turned on) and polling to determine active stations takes too long (a logical ring comprises physical units, such as stations, having a logical number assigned to each unit. The units are operated in a ring configuration (which may not be the same as physical arrangement or interconnection of the units) based on their assigned logical number in order to provide a modular type of operation.); (2) there is no centralized control or monitor to administer the system, i.e. find lost tokens, determine which stations are active, provide an up-to-date directory, e.g. in which cell a mobile station is presently located. (A cell is a geographical area within which a logical ring exists and stations physically located therein can hear each other's transmission via a repeater, i.e., the area over which reception from a repeater is possible); (3) it is not possible for all active stations to receive all packet transmissions due to propagation distance limitations; (4) a specific predetermined control channel frequency is typically assigned to each mobile and base receiver to monitor whereas each mobile and base transmitter can typically transmit at all control channel frequencies, and thus it is not possible to predict the level of usage of each control channel at any instant; (5) if a called station is not active, so that a call accept or call reject (busy) packet is not received by the calling station, then the calling station typically assumes that a collision with its call request packet has occurred and the calling station subsequently attempts to regain access to the control channel, resulting in undesirable increased control channel load.

Consider a hypothetical mobile radio communication system employing a carrier sense multiple access (CSMA) (see Tobaji, supra, page 471) protocol over a control channel, before access to a voice channel is permitted. Assume that at an instant during a peak hour all voice channels are busy and there are N stations, which are not transmitting but desire to transmit a control packet, waiting in a control packet queue. Also assume that the voice channel queue (stations desiring access to a voice channel) is growing at the rate of m stations per second. If T seconds later a voice channel becomes available, there will be $M = N + m \times T$ stations contending for a control channel in order to gain access to the free voice channel, either immediately or t seconds later, where t is a fixed number used by all busied out stations. Thus all M packets will collide with each other. Moreover, if q retransmissions are permitted after being unsuccessful in securing a voice channel, then the number of control packets in the control packet queue may eventually reach $q \times M$ packets, while the voice channel queue is still growing at the rate of m stations per second. The system would block, i.e. free control channels could not be accessed, for an indeterminate period of time, despite one or more voice channels being free.

One method for avoiding some of the problems experienced by the system described in the previous paragraph is to use a p—Persistant Carrier Sense Multiple Access protocol (see Tobagi, supra, p. 472). In accordance with this protocol, when a voice channel becomes available, M stations transmit with a probability of p and do not transmit with a probability of $(1-p)$. In order to have one successful transmission, i.e. one station gain access to a control channel, the mean of the binomial probability distribution must be equal to one, i.e. $p = 1/M$. However, it is very difficult to accurately estimate the value of M in a complex decentralized communication system since there is by definition no centralized authority to determine who was involved in a collision and which stations of all possible stations are included in M at any instant, i.e. which stations are trying to transmit.

A more advanced protocol, carrier sense multiple access with collision detection (CSMA/CD) (see Tobagi, supra, p. 473), requires that a station back-off, i.e. wait a predetermined interval after experiencing an unsuccessful attempt (e.g. collision with another packet, failure to receive a call accept or call reject packet) to access a control channel, before again trying to gain access to the control channel. This back-off procedure penalizes the unsuccessful station since stations newly desiring to gain access to the control channel may be successful during the back-off interval of the unsuccessful station. It would be desirable to provide priority status to an unsuccessful station such that all unsuccessful stations are permitted access to the control channel before any station not having experienced an unsuccessful attempt is permitted to try to gain access to the control channel.

Accordingly, it is an object of the present invention to provide a deterministic control channel accessing scheme for a mobile radio environment allowing up to about 80 percent control channel utilization.

Another object is to provide priority access to a control channel for emergency numbers such as police, fire department, ambulance, etc.

Still another object is to provide priority access to a control channel for stations having had an unsuccessful attempt to gain access to the control channel.

Yet another object is to minimize the number of collisions which result from inability to detect all transmissions by all stations.

BRIEF DESCRIPTION OF THE INVENTION

The method of the present invention provides access to one of a plurality of data channels of a decentralized radio system comprising a plurality of stations, wherein each station is assigned to monitor one of a plurality of control channels in order to perform a handshake routine between a calling station and a called station of the system over the control channel assigned to the called station, before establishing a communication link between the calling and called station over the one of the plurality of data channels.

A calling station searches for and reserves an idle data channel. There are two types of data channels, local and repeater. Local data channels are searched first for an idle channel and if none is found, repeater data channels are searched. After locating an idle data channel, the calling station busies out or reserves the idle channel by transmitting a tone and then monitors the control channel assigned to the called station. Transmissions received by the calling station over the control channel being monitored are decoded in order to determine which station in the logical ring had just had control of the token so that the calling station's time to start transmission can be determined in order to fit the calling station into its assigned position in the logical ring.

If a response is received from the called station indicating the called station is ready and able to accept a call, then a communication link is established over the data channel previously reserved. If no response is received or if the response indicates the called station is busy, another attempt is made to try to establish a communication link.

Provision is made to provide high priority to stations calling emergency numbers and to stations having previously experienced an unsuccessful attempt, i.e. busy indication or no response received, to establish a communication link.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

DETAILED DESCRIPTION

Figure 1:
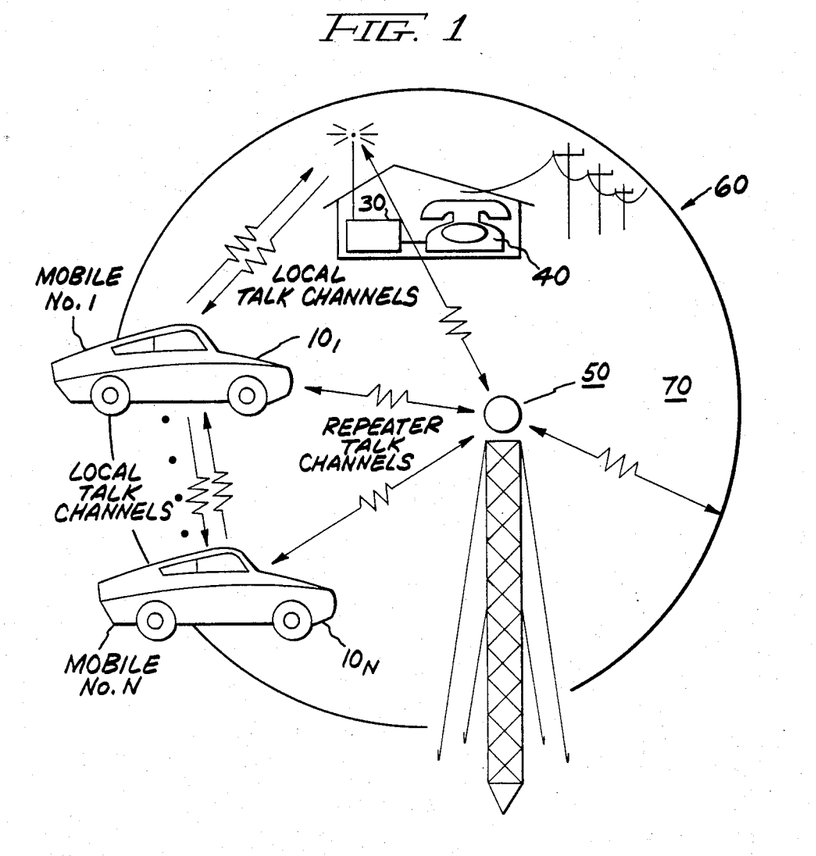
FIG. 1 is a schematic representation of a data transmission system of the general type with which the present invention may be used.

Referring to FIG. 1, a typical radio data communication system in which the present invention may be employed is shown. The data communication system includes a base station 30. The base station directly communicates with one or more mobile or portable stations $10_1$–$10_N$ over local talk radio channels and indirectly communicates through repeater 50 over repeater talk radio channels. Similarly, any of mobile stations $10_1$–$10_N$ may directly communicate with any other of mobile stations $10_1$–$10_N$ over local talk radio channels and indirectly communicate through repeater 50 over repeater talk radio channels. Further, base station 30 may be connected to a telephone 40, so that telephone calls may be automatically made on the public switched telephone network through base station 30 from mobile stations 10 without user intervention at base station 30.

Typically direct mobile to mobile communication line of sight (LOS) range is about 2-3 miles, which range is limited predominately by antenna height, generally about 10 feet maximum. Direct mobile to base communication LOS range is about 3-5 miles since generally a higher antenna, say about 26 feet, is available at the base station. It is anticipated that repeaters would be located on high ground, such as a hill, or atop a tall building, such that maximum direct mobile to repeater communication LOS range is about 15 miles, shown as a boundary 60 of cell 70 served by repeater 50. Further, there are generally a limited number of channels within a frequency band which must be allocated between direct talk channels, repeater talk channels and control channels, i.e. channels over which a handshake routine is performed in order to assign available idle or free talk channels to mobile $10_1$–$10_N$ and base 30 stations requesting a talk channel.

Because LOS range limitations of the system permit channel reuse within a cell served by repeater 50, all requests for an idle channel are first attempted to be satisfied by assignment of a local talk channel (LTC), thus conserving use of the limited number of repeater talk channels. Assignments of local talk channels are based on a detemination at each respective calling station of whether there is an idle local talk channel. An idle channel is busied out or reserved, i.e. a tone on the idle channel is transmitted by the calling station, by the calling station before the control channel access procedure (hand-shake routine) is initiated.

As an example of channel reuse, consider the situation where there are two pairs of mobile stations A1, A2, and B1, B2, respectively, with station A1 desiring to call station A2 and station B1 desiring to call B2. Further assume that members of a pair are within direct communication LOS range of each other, that neither member of pair A is within direct communication LOS range of either member of pair B and that both pairs are located within the same cell, i.e. within LOS range of the same repeater. (These location requirements may be satisfied due to the size of LOS range limitations discussed above). If station A1 first establishes a radio link with station A2 over direct talk channel Z, and then station B1 attempts to contact station B2, direct talk channel Z may also be assigned to the station B1 to station B2 radio link since as far as stations B1 and B2 can determine channel Z is idle. Thus, depending on the location of the calling and called stations within the cell, and the direct LOS range limitations of the respective stations, it is possible to have multiple assignments of the same direct talk channel within a cell without radio frequency interference occurring between the commonly assigned parties.

A calling station first tries to locate a local talk channel and if a local talk channel is not available (i.e. none are idle), then the calling station automatically tries to access an idle repeater talk channel (RTC) to complete the communication link to the called station. Once an idle LTC or RTC is found, the calling station busies out the idle channel by transmitting a tone over the idle channel and then initiates the control channel access (handshake) routine to try to access the control channel of the called station. If no idle local or repeater talk channel is found after a predetermined number of attempts, then the calling station must reinitiate the call process.

Callers who have had a previous unsuccessful attempt to gain access to a control channel or to receive a response from the called station over the control channel are given priority for control channel access. Provision is also made for callers who are trying to reach emergency numbers and other preidentified high priority numbers to have immediate access to the system without waiting for previously unsuccessful callers to terminate their try-again routines.

Figure 2:
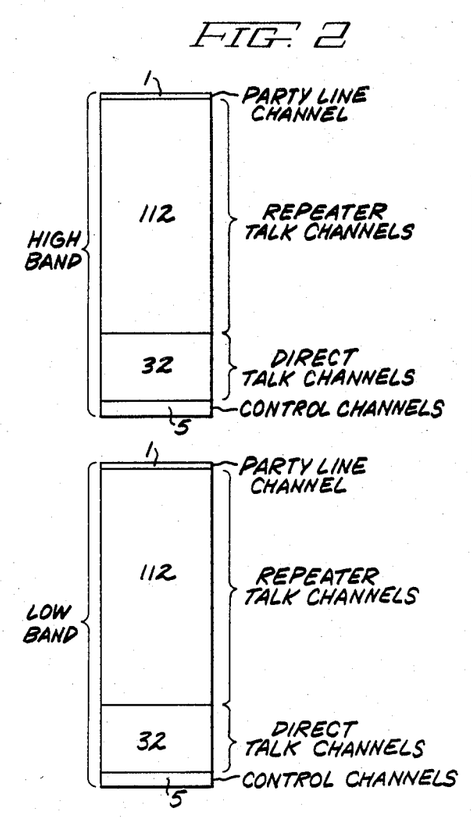
FIG. 2 is a schematic representation of channel frequency allocations useful with the accessing scheme of the present invention.

Shown in FIG. 2 is a predetermined assignment of 150 channels in the 900 MHz band with each channel having a bandwidth of 30 kHz. The assignment permits use of separate transmit and receive frequencies with a 45 MHz spacing between frequency pairs to provide full duplex operation in the direct talk mode. The repeater talk mode is two frequency simplex. The single party line channel is operator selectable and permits the station to perform in a CB-like mode of operation. There is no repeater mode for the party line channel.

Although specific frequencies and number of channels have been provided by way of example, it is to be understood that the accessing scheme of the present invention is applicable for assigning idle talk channels and for providing control channel access to any decentralized system regardless of the transmit and receive frequencies, channel bandwidths, number of channels, simplex or duplex operation, mobile or stationary stations and direct or repeater operation.

Figure 3:
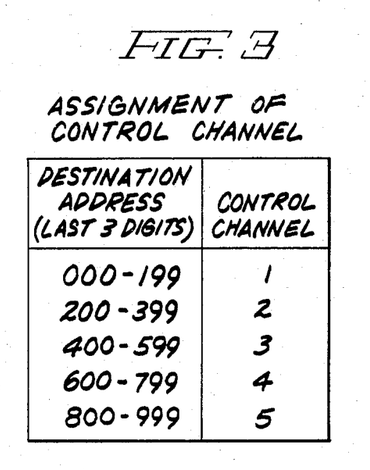
FIG. 3 is a table of control channel assignments useful with the accessing scheme of the present invention.

Shown in FIG. 3 is a possible arrangement of control channels to which the transceiver at a station is tuned when not involved in a communication link. A control channel is predeterminedly assigned to each station. Typically, the assignment of a control channel may be determined by the three least significant digits of the station identification number in order to avoid having assignments concentrated in a few of the available control channels. The station's identification number or code is predeterminedly assigned (analogous to assignment of telephone number) and must be used for all calls to the station, except for calls over the party line channel. Of course, other pre-identified group or groups of numbers within a station's identification number may be used to determine which control channel a destination station is monitoring.

Idle local or repeater talk channel selection is accomplished through exchange of digitally encoded command messages or data packets between the source (calling) and destination (called) stations over a control channel. During talk channel selection, the source station acts as a "master" and the destination station as a "slave". When seeking to complete a communication link over a direct talk channel, the source station transmits a command message on the control channel in the high band which the destination station is monitoring and the destination channel responds on the corresponding control channel in the low band. When attempting to complete a communication link over a repeater talk channel, the source station transmits a command message to the repeater on the control channel in the low band which the destination channel is monitoring and the repeater transmits the command message to the destination station on the corresponding high band control channel.

Figure 4:
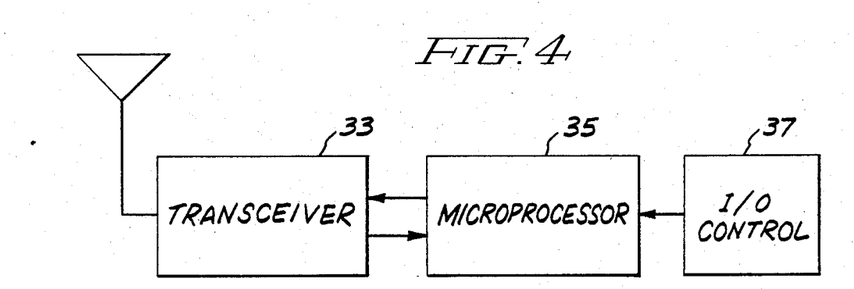
FIG. 4 is a block diagram of a transceiver useful with the accessing scheme of the present invention.

Referring to FIG. 4, a block diagram of apparatus useful with the present invention is shown. The apparatus illustrated in FIG. 4 is situated at each respective base and mobile station of the system. Microprocessor 35 has an output connected to an input of transceiver 33 and a first input connected to an output of transceiver 33. A second input of microprocessor 35 is connected to an output of input/output (I/O) control circuitry 37.

Microprocessor 35 may be a type 8051 integrated circuit manufactured by Intel, Inc., Santa Clara, Calif., or the like. A type 8051 integrated circuit includes a read only memory (ROM) wherein programs, such as those represented by the flow diagrams of FIGS. 5-9, may be stored. If the microprocessor selected does not include a ROM, then one may be provided as is known in the art. I/O control circuitry 37, comprises controls (not shown), such as switches, for operator selectable functions, e.g. call initiate, party line select, repeater assignment and called (destination) station identification.

Microprocessor 35 provides digitally encoded signals to transceiver 33 for assigning appropriate frequencies thereto and transceiver 33 provides microprocessor 35 with digitally encoded signals indicating the status of a called station, i.e. whether a response has been received over a control channel during the hand-shaking routine and if so, the type of response, e.g. station idle, station busy.

Figure 5:
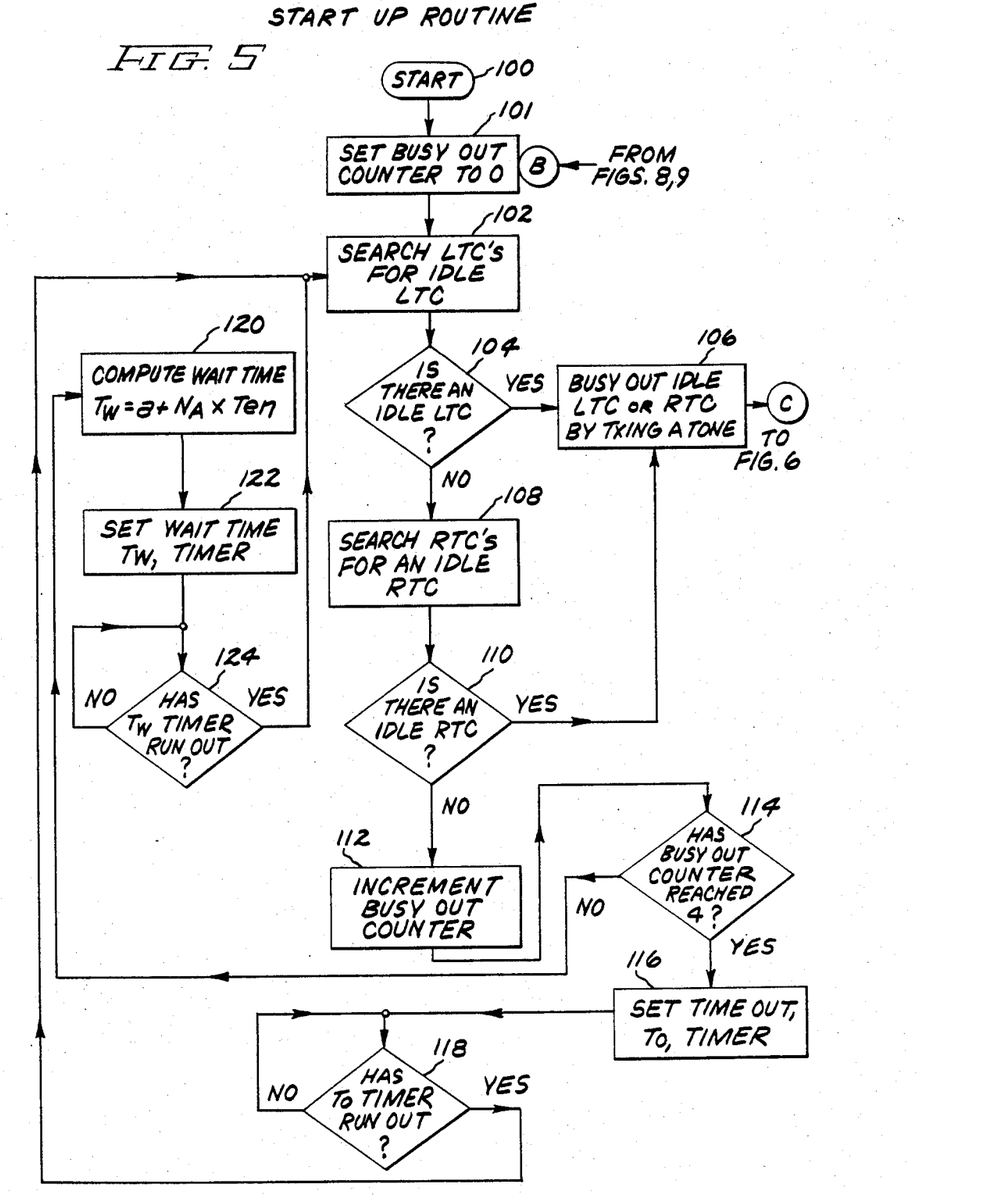
FIGS. 5–9 are flow diagrams of a program useful with a microprocessor employed in the present invention.

Referring to FIG. 5, a start-up routine of the main program useful for the present invention is shown. Step 100 is executed to reset all counters and timers of the calling station each time the main program of the calling station is accessed. Proceeding to step 101 the busy out counter is set to zero. Execution of step 102 initiates a search for an idle local talk channel (LTC). If no idle LTC is detected, the calling station at step 108 calls the calling station's assigned repeater which commences a search for an idle repeater talk channel (RTC). If no idle RTC is detected, step 112 increments the busy out counter by 1. Execution of step 114 determines whether the busy out counter has reached a count of 4. If the busy out counter has reached a count of 4, at step 116 a time out timer $T_o$ is set to a predetermined value. The value to which time out timer $T_o$ is set, typically 3-5 seconds, is determined by the time interval it is desired to wait before permitting the program to repeat step 101 in order to attempt to detect an idle LTC or RTC after having had the number of unsuccessful attempts used as the test by test 114, to find an idle LTC or RTC. Execution of step 118 causes the program to wait by looping through step 118 until time out timer $T_o$ has run out, at which moment the routine repeats step 101. Of course, time out timer $T_o$ may be set arbitrarily small, such as zero, so that no appreciable delay exits between execution of step 116 and the return to step 101 from step 118 of the routine. Also, a greater or lesser number than four may be tested for by step 114 should it be desired that more or fewer, respectively, chances be given to detect an idle LTC or RTC. If the busy out counter $T_o$ has not reached the test number when step 114 is executed, the wait time $T_w$ is computed at step 120 before execution of step 102 can be repeated. Wait time $T_w$ is determined by the equation $T_w = a + N_A \times T_{en}$, wherein a is a constant to ensure an initial adequate back off time for low LUN's, $N_A$ is the LUN (logical unit number), i.e. the last three digits of the addressee's or called station's identification number, and $T_{en}$ is the backoff time, in milliseconds. Backoff time $T_{en}$ generally increases after each unsuccessful attempt to find an idle LTC or RTC. For example, backoff time $T_{en}$, wherein n represents the number of unsuccessful attempts, i.e. number in the busy out counter, may assume values of 10, 20, 40, and 80 milliseconds, respectively, for each successive unsuccessful attempt to detect an idle LTC or RTC. Execution of step 122 sets the wait time timer to the value $T_w$ determined in step 120. The program then waits by looping through step 124 until the wait time timer runs out at which time the program repeats step 102 to reinitiate the search for an idle LTC or RTC.

Figure 6:
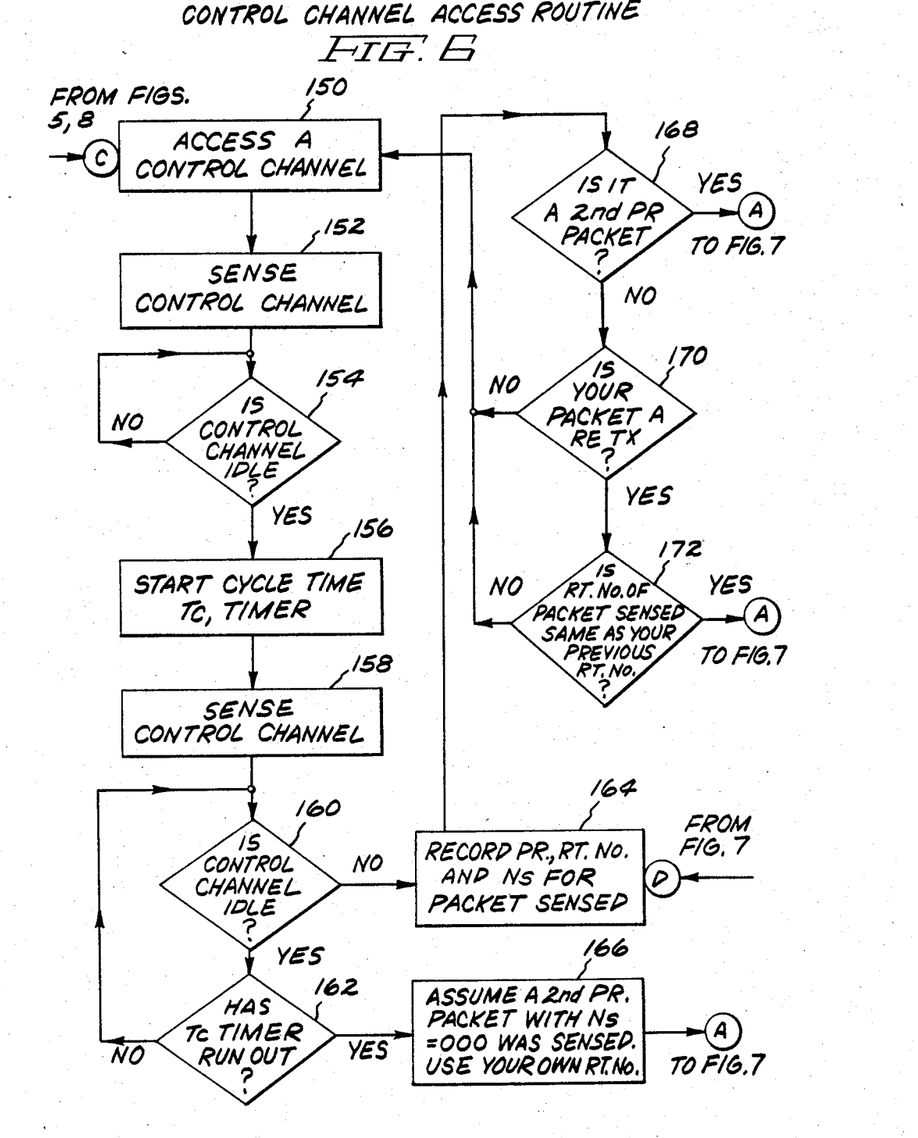

If either an idle LTC or RTC is detected at step 104 or step 110, respectively, then step 106 is performed to busy out or reserve the detected idle channel by transmitting (TXING) a tone on the channel and the program proceeds to step 150 of the control channel access routine shown in FIG. 6. Execution of step 150 accesses a control channel whose condition (i.e., in use or not in use) is sensed by performing step 152. There are a plurality of control channels and the particular control channel accessed is the one assigned to the addressee station. A typical assignment scheme for a system comprising five control channels may apportion control channels based on the last three digits (LUN) of the addressee's identification number (FIG. 3). That is, control channel 1 is assigned to LUNs 000 to 199, control channel 2 is assigned to LUNs 200 to 399, etc. The program waits by looping through step 154 until the accessed control channel is determined to be idle at which time step 156 is performed to start the cycle time timer $T_c$. Execution of steps 158 and 160 involves sensing the control channel and determining if the control channel is idle, respectively. If the control channel is determined to be idle then at step 162 whether cycle timer $T_c$ has run out is determined. If the cycle time timer has not run out, step 160 is repeated. The program continues to perform steps 160 and 162 until either the control channel is determined to be not idle or the cycle time timer has run out.

If the cycle time timer has run out, the program proceeds to execute step 166. Since the cycle time timer has run out and no packet has been detected, as indicated by the control channel remaining idle during cycle time $T_c$ interval, at step 166 an assumption is made that a phantom second or lower level priority packet with $N_S$ equal to 000 and a repeater number of the calling station was sensed. $N_S$ is the LUN of any packet received from a sending station in the system other than the calling station. These assumptions are necessary since there is no central authority in the system to start tokens or to find lost tokens. If the control channel is not idle when step 160 is performed, step 164 is executed by decoding and recording the priority, repeater number and $N_S$ of the packet which was sensed by execution of step 160. Step 168 is then performed to determine if the received packet is a second priority packet. If it is not a second priority packet, then step 170 is executed to determine if the packet the calling station is attemptine to send is a retransmission. If the calling station packet is not a retransmission, step 150 is repeated, and if it is a retransmission, step 172 is executed to determine whether the repeater number of the packet sensed from the sending station is the same as the repeater number of the last transmission from the calling station. If these repeater numbers are not the same indicating the sending station is not a member of the same logical ring as the calling station, step 150 is repeated.

Figure 7:
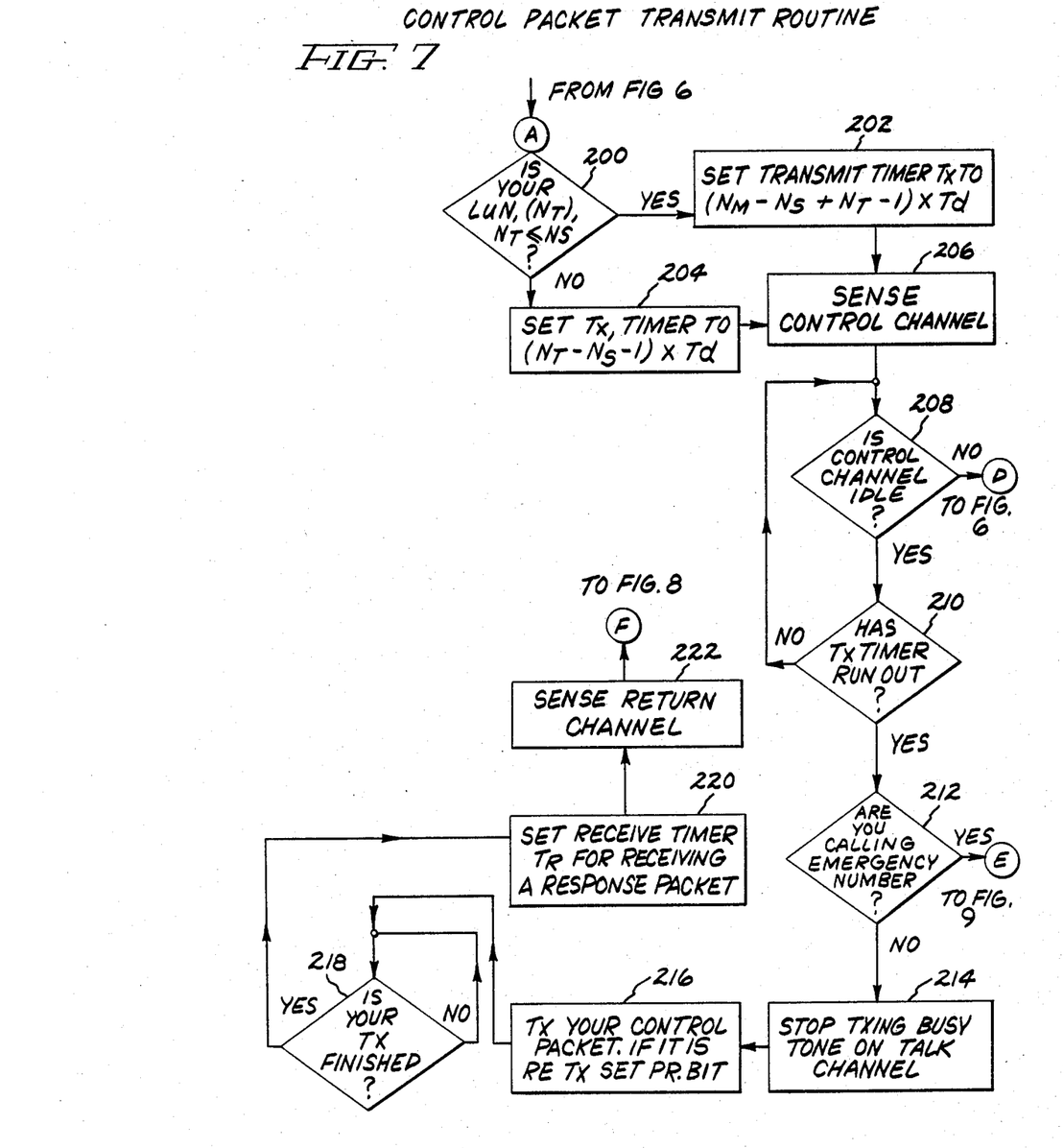

After performing step 166, determining that the received packet is a second priority packet (step 168) or determining that the repeater number of the packet sensed is the same as the repeater number of the last packet the calling station transmitted (step 172), the program proceeds to step 200 (FIG. 7).

There are two levels of control packet priority in the system. The priority is encoded into a control packet using one bit at a predetermined location. Should more than two priorities be desired then more than one bit is required. The first or higher priority includes control packets trying to gain access to an emergency number, such as police station, hospital, fire department, etc., and retransmission packets, i.e. packets from a calling station which previously transmitted a control or retransmission packet but did not receive a response from the called station. Information identifying a retransmission packet is also encoded into the packet using one bit at a predetermined location. All other packets have second priority.

All packets, including any which have been sensed by execution of step 160, tow virtual tokens at a distance (token time interval) which is a function of the walk time (defined below) between the station originating the packet (sending station) and the calling station. Furthermore, the priority of the token is the same as the priority of the packet which tows it.

A station is allowed to transmit a control packet only while it controls a token. There are two rules associated with gaining control of a token. The first rule is that for a station to be able to use a first priority token it must have a first priority packet to transmit (steps 160, 164, 168, 170). The second rule, which applies to all priorities, is that in order for a station to receive a token, the time (token time interval) between the end of the packet and the token must not be invaded by another packet, i.e. no packet from a sending station sensed in the token time interval (steps 160, 162).

Referring to FIG. 7, the control packet transmit routine is shown. Execution of step 200 determines whether the LUN of the calling station ($N_T$) is less than or equal to the LUN of the sensed packet ($N_S$) from the sending station or phantom packet, i.e. 000. If $N_T$ is not less than or equal to $N_S$, then at step 204 transmit timer $T_X$ is set equal to $(N_T-N_S-1)\times T_d$ which is the token wait time or interval, wherein $T_d$ is the decode time, i.e. the time it takes for a station to start transmitting a packet after receiving the end of a token towing packet. Decode time $T_d$ is also the walk time between two adjacent stations on the logical ring. If $N_T$ is less than or equal to $N_S$, the transmit timer $T_X$ at step 202 is set to a token wait time or interval equal to $(N_M-N_S+N_T-1)\times T_d$ wherein $N_M$ represents the number of stations on the logical ring. If LUNs are the last three digits of addressee's unique identification code then $N_M$ is equal to 1000, i.e. $10^3$.

In a retransmission, the retransmission control packet is always identified as a first priority packet. As a result, at least one sweep around a logical ring is reserved for all first priority packets if a retransmission control packet is sent. In this manner, it is possible to eliminate from the control packet queue all stations which previously experienced a collision or did not receive a response to a control packet, before permitting new stations to try to gain access to the control channel (unless, of course, a new station is trying to call an emergency number, i.e. first priority). To permit flushing out to occur without further collisions, decode time $T_d$, used in retransmissions, is made a random variable with a typical mean ($\overline{T}_{dn}$) as follows:

$\overline{T}_{d1}=1$ msec.

$\overline{T}_{d2}=2$ msec.

$\overline{T}_{d3}=4$ msec.

$\overline{T}_{d4}=8$ msec.

wherein n is the number of attempts for retransmissions of the same control packet, for use by steps 202 and 204. Establishing a random variable having a predetermined mean is known in the art and may be performed by a local communications controller 82536, manufactured by Intel, or the like.

After establishing the token wait time, step 206 is performed to sense whether the control channel is idle. If the control channel is idle, step 210 is executed to determine if transmit timer $T_X$ has run out. If transmit timer $T_X$ has not run out, step 208 is repeated and the program continues to loop through steps 208 and 210 until transmit timer $T_X$ runs out, at which time step 212 is performed to deterine if the number or unique identification code of the called station is an emergency number. If the number being called is not an emergency number, step 214 is executed to stop transmitting the busy tone which was generated by execution of step 106 (FIG. 5) on the LTC or RTC determined to be idle by step 104 or 110 (FIG. 5), respectively. Step 216 is performed to transmit the control packet of the calling station and, if it is a retransmission, to set the priority bit of the control packet. The program then waits by looping through step 218 until the transmission of the control packet is completed at which time step 220 is executed to set a receive timer $T_R$ for receiving a response packet from the called station and step 222 is executed to sense the return control channel. Receive timer $T_R$ is generally set to the maximum time anticipated for receiving a response packet on the return channel from a called station.

If the control channel is not idle when step 208 is performed, the program proceeds to step 164 (FIG. 6) which it executes in accordance with the procedure hereinbefore described, in order to try to obtain the token towed by the packet received from a sending station. If the number being called is an emergency number, then the execution of step 212 causes the program to proceed to step 300 (FIG. 9) to begin execution of the routine for emergency numbers which is described in more detail below.

Figure 8:
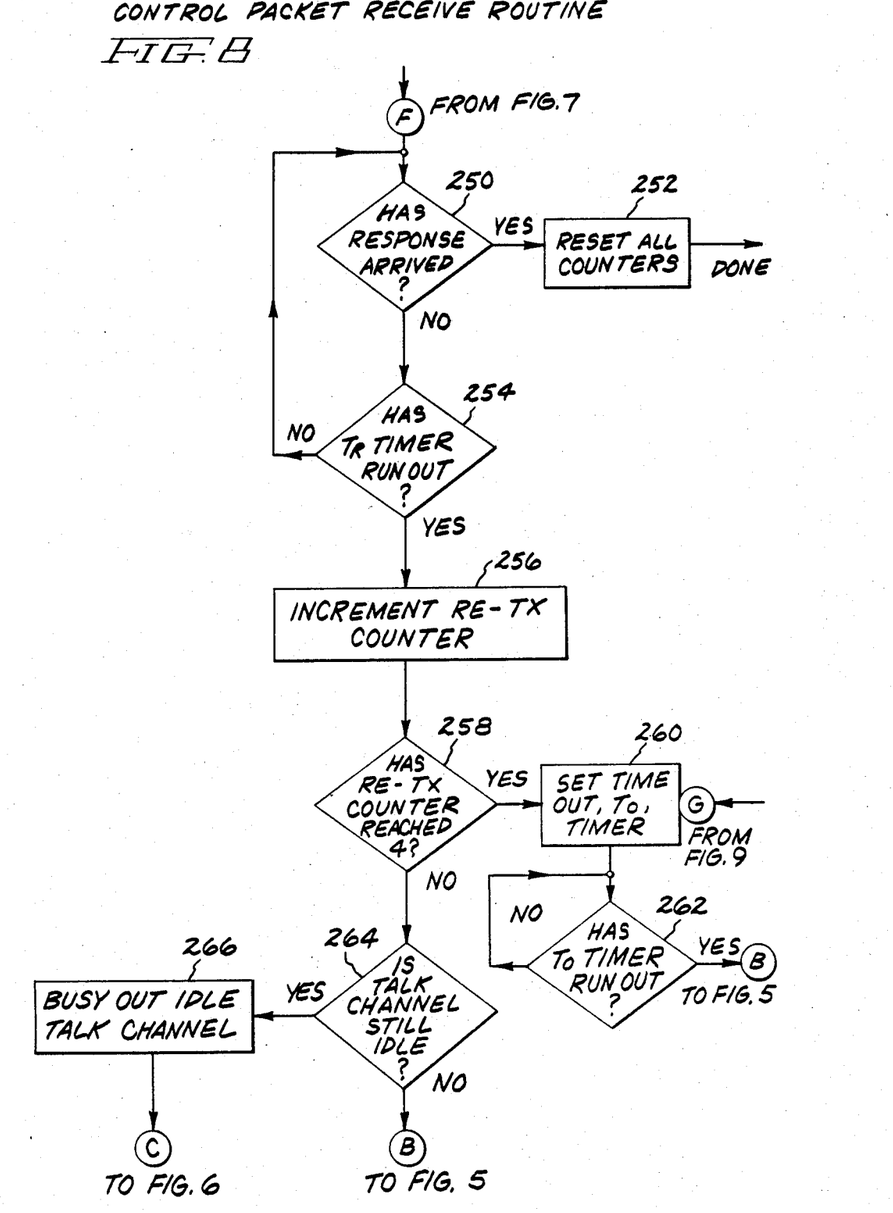

Referring to FIG. 8, the control packet receive routine is shown. After executing step 222 (FIG. 7), the program performs step 250 to determine if a response has arrived on the return channel from the called station. If a response is sensed and it indicates that the called station is free to accept a call, then a communication link is established between the calling and called station over the LTC or RTC previously determined to be idle by step 104 or step 110 (FIG. 5), respectively. The response may alternatively indicate that the called station is busy, i.e. has established or is trying to establish a communication link. After receiving any response, step 252 is executed to reset all program counters. If a response has not arrived on the return channel when step 250 is performed, step 254 is executed to determine if receive timer $T_R$ has run out. If receive timer $T_R$ has not run out, the program repeats step 250 and continues to loop through steps 250 and 254 until the receive timer runs out, at which time step 256 is executed to increment the retransmission counter. Step 258 is then performed to determine if the retransmission counter has reached a count of 4. If the retransmission counter has reached 4 (a greater or lesser number may be used as desired) step 260 is performed to set the time out timer $T_o$ to a value which equals the time the program must wait before the start up routine of FIG. 5 is repeated. After setting the time out timer $T_o$, the program waits by looping through step 262 until the time out timer runs out, at which time step 101 is repeated (FIG. 5) to reinitiate the start up routine.

Lack of a response from a called station to a control packet may indicate: two or more stations on a logical channel had the same LUN, i.e. they all attempted to reach stations having the same last three digits of identification code; the called station's transceiver was not turned on; two or more stations were unable to hear each others' transmissions—they obtained and used the same token from the same packet—a collision (i.e., transmissions from two or more stations within the same time interval and within receive range of a receiving station such that the integrity of the detected transmission at the receiving station cannot be assured) between control packets occurred; a station obtained tokens from two or more logical rings at different times.

A logical ring is formed in a cell wherein all stations can hear transmissions from the same repeater. There may be stations situated near the reception fringes of a cell. These stations can generally hear transmissions from two or more repeaters. The encoding of a repeater identification number into control packets and determining whether the repeater number of the received packet (which is also the repeater number of the token) from a sending station is the same as the repeater number of a calling station (FIG. 6, step 172) before allowing the calling station to obtain the packet minimizes the number of collisions (due to obtaining tokens from more than one logical ring) by forcing a station to remain within one logical ring. In the case of a mobile station moving from one cell to another, an operator must change the assigned repeater identification at I/O control 37 (FIG. 4) of the mobile station.

If the retransmission counter has not reached 4 when step 258 is performed, step 264 is performed to determine if the LTC or RTC as determined by step 104 or 110 (FIG. 5), respectively, is still idle. If the LTC or RTC is not still idle, step 101 (FIG. 5) is repeated to reinitiate the start up routine. If the LTC or RTC is determined at step 264 to still be idle, step 266 busies out the LTC or RTC by transmitting a tone and step 150 (FIG. 6) is repeated to reinitiate the control channel access routine.

Figure 9:
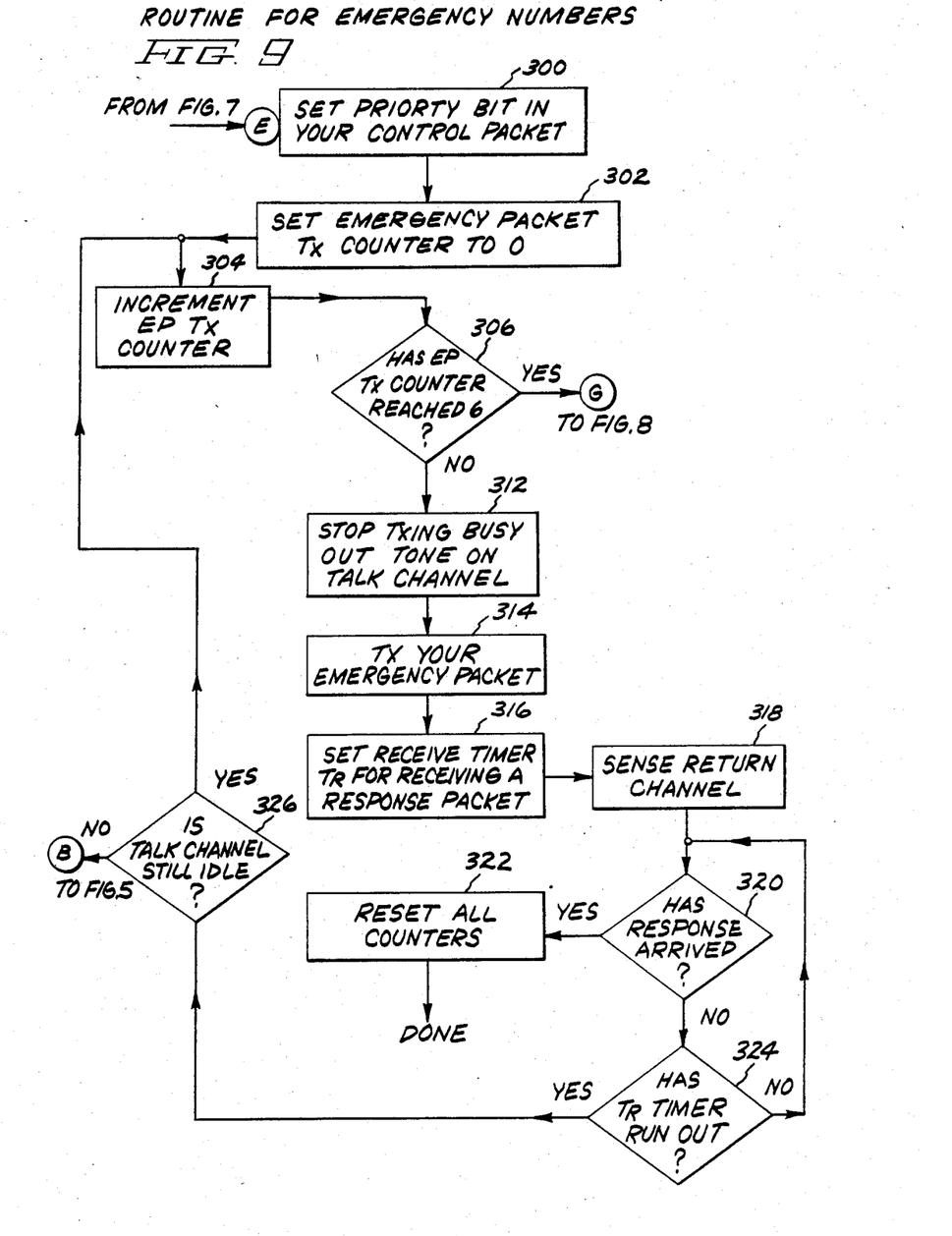

Referring to FIG. 9, the routine for calling emergency numbers is shown. If at step 212 (FIG. 7) it is determined that the calling station is calling an emergency number, the program proceeds to step 300 to set the priority bit in the control packet of the calling station. Step 302 is performed to set the emergency packet (EP) counter $T_x$ to zero and execution of step 304 increments the emergency packet counter $T_x$. Execution of step 306 determines if the emergency packet counter has reached 6 (a greater or lesser number may be used as desired). If it has reached 6, then execution of step 260 (FIG. 8) sets the time out timer $T_o$ and the program waits by looping through step 262 until the time out timer $T_o$ runs out. After the time out timer runs out, step 101 (FIG. 5) is repeated to reinitiate the start up routine.

If the emergency packet counter has not reached 6 when step 306 is performed, execution of step 312 causes the program to stop transmitting the busy out tone that was generated by execution of step 106 (FIG. 5), on the LTC or RTC determined at step 104 or 110 (FIG. 5), respectively, to be idle. Execution of step 314 causes the emergency packet to be transmitted and execution of step 316 sets the receive timer $T_R$ for receiving a response packet as hereinbefore described. Execution of step 318 senses the return channel and execution of step 320 determines whether a response has arrived on the return channel from the emergency station. If execution of step 320 results in sensing a response on the return channel and the response indicates that the emergency station is free to accept a call, then a communication link is established between the calling and emergency station, over the idle LTC determined at step 104 or idle RTC determined at step 110 (FIG. 5). The response may alternately indicate that the emergency station is busy, i.e. has established or is trying to establish a communication link. After receiving any response, step 322 is performed to reset all counters. If a response has not been received from the emergency station when step 320 is performed, step 324 is performed to determine if receive timer $T_R$ has run out. If the receive timer has not run out, step 320 is repeated and the program continues to loop through steps 320 and 324 until the receive timer runs out. When the receive timer runs out, step 326 is executed to determine if the LTC or RTC determined in step 104 or step 110 (FIG. 5), respectively, is still idle. If the LTC or RTC is not still idle the program repeats step 101 (FIG. 5) to reinitiate the start up routine. If the LTC or RTC determined to be idle at step 104 or step 110 (FIG. 5), respectively, is still idle when step 326 is executed, the program repeats step 304 and increments the emergency packet counter. The program continues to loop through step 304 to step 326 until execution of step 306 determines that the emergency packet counter has reached 6, execution of step 320 determines that a response has been received from the emergency station or execution of step 326 determines that the LTC or RTC is still idle. As indicated at step 306, six attempts are permitted to try to secure a local or repeater talk channel when an emergency number is being called. Of course, the program may be modified to provide for a greater or lesser number then six attempts.

Thus has been illustrated and described a method for providing deterministic control channel access for a mobile radio environment allowing up to about 80 percent control channel utilization. Further, priority control channel access is provided for emergency numbers and for stations having had an unsuccessful attempt to gain access to the control channel. Additionally, the number of collisions resulting from inability to detect all transmissions by all stations has been minimized.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A method for accessing one of a first plurality of data channels of a decentralized radio system comprising a plurality of stations, wherein each station is predeterminately assigned to monitor one of a plurality of control channels and assigned a unique identification code, in order to perform a hand-shake routine over the control channel assigned to a called station, before establishing a communication link between a calling and said called station over said one of said plurality of data channels, comprising:
(a) searching said data channels at said calling station until an idle one of said data channels is obtained;
(b) reserving said idle data channel;
(c) monitoring at said calling station the control channel assigned to said called station, after reserving said idle data channel;
(d) transmitting a control packet on the control channel being monitored by said calling station after the control channel has been determined to be idle for a predetermined interval; and
(e) monitoring the control channel after transmitting a control packet to determine if a response packet from the called station is received.

2. The method as in claim 1, wherein said system further comprises a repeater station having a second plurality of data channels, said method further comprising searching at said repeater station for an idle data channel selected from said second plurality of data channels in response to a command by said calling station.

3. The method as in claim 2 wherein said first plurality of data channels is searched before said second plurality of data channels is searched.

4. The method as recited in claim 3 wherein said unique identification code comprises a logic unit number.

5. The method as in claim 4 wherein said predetermined interval comprises a transmit time equal to $(N_M - N_S + N_T - 1) \times T_d$ when the logical unit number (LUN) of the calling station is less than or equal to the LUN of a sending station and equal to $(N_T - N_S - 1) \times T_d$ when the LUN of the calling station is greater than the LUN of the sending station, wherein:
$N_T$ = LUN of calling station,
$N_S$ = LUN of sending station,
$N_M$ = number of stations on logical ring and $T_d$=decode time, and the LUN of the sending station ($N_S$) is decoded from a control packet sensed while monitoring at said calling station the control channel assigned to said called station and $N_S$ is equal to zero when no control packet is sensed while monitoring at said calling station the control channel assigned to said called station.

6. The method as in claim 5 further comprising retransmitting a control packet on the control channel being monitored by said calling station if no response packet is received from the called station, wherein $T_d$ is a random variable having a predetermined mean value.

7. The method as in claim 6 further comprising repeating retransmission of a control packet a predetermined number of times wherein $T_d$ is a random variable having a different mean value during each retransmission.

8. The method as in claim 6 further comprising assigning the highest priority to said control packet being retransmitted on the control channel.

9. The method as in claim 1 further comprising communicating between said calling and said called station over the data channel determined to be idle when a response packet received from the called station indicates the called station is free to complete the communication link between said calling and said called station.

10. The method as in claim 1 further comprising assigning priority to said control packet wherein said priority is encoded into said control packet.

11. The method as in claim 10 further comprising assigning the highest priority to said control packet addressed to an emergency station.

12. In a decentralized radio system including a plurality of stations wherein a plurality of data channels are provided for communication between said stations, a method for establishing a communication link between a calling station and a called station comprising the steps of:

providing a plurality of control channels for performing a handshake routine between said calling station and said called station before establishing communication over one of said plurality of data channels;

monitoring at each station a predetermined one of said control channels;

monitoring at said calling station the particular control channel being monitored by said called station until this channel is determined to be idle for a first predetermined time interval;

transmitting a control packet from said calling station to said called station on said particular channel after said particular channel has been determined to be idle for said first time interval; and monitoring said particular control channel at said calling station after transmitting said control packet to determine if a response packet is received from said called station and, if so, establishing communication between said calling station and said called station over one of said plurality of data channels.

* * * * *